(12) United States Patent
Haislet et al.

(10) Patent No.: US 6,811,877 B2
(45) Date of Patent: Nov. 2, 2004

(54) REINFORCING STRUCTURE

(75) Inventors: Gary Allen Haislet, Asheboro, NC (US); George C. Tunis, III, Berlin, MD (US); Emmanuel Albert Gooding, Asheboro, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/372,438

(22) Filed: Feb. 21, 2003

(65) Prior Publication Data

US 2004/0166299 A1 Aug. 26, 2004

(51) Int. Cl.$^7$ .................................................. D02G 3/00
(52) U.S. Cl. ...................... 428/377; 428/371; 428/373; 57/210; 57/212; 57/217; 57/902; 152/451; 152/558
(58) Field of Search ................. 428/379, 373, 428/376, 397, 371, 364, 222, 377; 57/210, 212, 217, 902; 152/451, 558

(56) References Cited

U.S. PATENT DOCUMENTS

| 4,544,603 A | * | 10/1985 | Richards ...................... 428/371 |
| 4,718,224 A | * | 1/1988 | Obata .......................... 57/212 |
| 6,007,912 A | * | 12/1999 | Doujak ....................... 428/379 |
| 6,334,293 B1 | | 1/2002 | Poethke et al. ............... 57/210 |
| 2002/0037409 A1 | | 3/2002 | Tunis .......................... 428/375 |

* cited by examiner

*Primary Examiner*—Merrick Dixon
(74) *Attorney, Agent, or Firm*—Nancy T. Krawczyk

(57) ABSTRACT

A reinforcing structure designed for handling compression stress states when the structure is molded into a composite. The structure, specifically a wrapped cord with metallic filaments contained therein, is suitable for both compression and tension load forces. The reinforcing structure has a core comprising a plurality of essentially straight, nested filaments arranged in parallel, the filaments forming a line of contact with adjacent filaments that extends along the length of the filaments. Wrapped about the core is at least one helically wound wire.

16 Claims, 2 Drawing Sheets

REINFORCING STRUCTURE

FIELD OF THE INVENTION

The present invention is directed toward a reinforcing structure useful for reinforcing a variety of elements. Specifically, the reinforcing structure is a cord defined by core filaments and a helical wound wrap wire. The structure is designed for both compressive and tensile loading conditions.

BACKGROUND OF THE INVENTION

Metallic cord structures can be successfully used as the reinforcement means in composites wherein the materials to be reinforced are elastomers, reinforced plastics, and cementious systems. Traditional cord structures found in tire constructions are known to work well in these composites, especially when the application of the composite is dominated by a tension stress state. However, using traditional cord structures, there are limitations to the use of composite systems when the application in which the composite is applied is subjected to compression stress states.

There are four factors that contribute to low compressive behavior in composites made with typical metallic cord structures. They are 1) low composite packing density due to asymmetric cord structures or inefficient intra-cord packing due to geometrical interference, 2) kinks caused by permanent deformations of the core filaments (usually found in cords constructed in accordance with U.S. Pat. No. 4,022,009, such as a 3×2), 3) core filament misalignment (typical of cords such as a 12×1), and 4) small core filament diameter and lack of support.

U.S. Pat. No. 4,718,224 discloses a cord for reinforcing elastomeric structure, in particular, tire belt plies. The cord has a wrapped construction wherein the core has a plurality of aligned center filaments such that one axis of the cord has a greater dimension that the perpendicular axis. This cord exhibits greater tensile properties along the greater axis, but is insufficient when subjected to compression stress states due to the unequal axis.

SUMMARY OF THE INVENTION

The present invention is directed toward a reinforcing structure designed for handling compression stress states when molded into a composite. The structure, specifically a wrapped cord with metallic filaments contained therein, is suitable for both compression and tension load forces.

The reinforcing structure has a core comprising a plurality of essentially straight, nested filaments arranged in parallel, the filaments forming a line of contact with adjacent filaments that extends along the length of the filaments. Wrapped about the core is at least one helically wound wire.

In one aspect of the invention, all of the nested filaments in the core are formed from metallic filaments. The filaments may have a diameter of at least 0.30 mm.

In another aspect of the invention, the helically wound wires have a diameter less than the diameter of the nested filaments. The helically wound wires have a diameter in the range of 0.10 to 0.30 mm. The helically wound wires may be wound at a helix wrap angle less than the buckling wave length of the nested filaments. The buckling wave length of the nested filaments is approximately equal to the square of the core filament diameter. However, the helix wrap angle may be optimized for cost effective support of the core filaments in compression, resulting in a helix wrap angle of greater than the buckling wave length.

In another aspect of the invention, the nested filaments are essentially straight and have a twist lay length of greater than 30 mm. Preferably, the twist lay length is infinity, resulting in straight core filaments.

In another aspect of the invention, to increase the compression force capability of the cord, within any interstices formed in the core between the nested filaments and between the nested filaments and the helically wrapped wires, fiber filaments may be placed.

The fiber filaments placed in the interstices may be selected from the group of glass, carbon, cotton, KEVLAR, polypropylene, nylon, polyester, aramid, wool, and metallic fibers such as aluminum, titanium, beryllium or other like filament or fiber.

In another aspect of the disclosed invention, a composite is formed. The composite is formed from the disclosed reinforcing structure and a binding matrix. The binding matrix may be selected from the group the group of elastomer, thermoplastic, cement mixes, and wood laminates.

In yet another aspect of the invention, the reinforcing structure may be formed into a tape. The tape has multiple reinforcing structures aligned and fixed in parallel to one another. To secure the structure of the tape, the reinforcing cords may be woven, glued, or secured together by other means in any manner that will maintain the orientation of the cords relative to each other.

Definitions

The following definitions are applicable to the present invention:

"Composite" means a material containing both a reinforcement means and a binding matrix or resin. The binding matrix or resin may be types of elastomers, thermoplastics, wood laminates, or cement mixes. Within the context of this invention, the reinforcement means is a multi-filament cord or a fabric, tape, or sheet formed from a multi-filament cord.

"Cord" means a plurality of gathered filaments to form a unitary structure.

"Normal Tensile Strength (NT) Steel" means a carbon steel with a tensile strength of at least 2800 MPa @ 0.20 mm filament diameter.

"High Tensile Strength (HT) Steel" means a carbon steel with a tensile strength of at least 3400 MPa @ 0.20 mm filament diameter.

"Super Tensile Strength (ST) Steel" means a carbon steel with a tensile strength of at least 3650 MPa @ 0.20 mm filament diameter.

"Ultra Tensile Strength (UT) Steel" means a carbon steel with a tensile strength of at least 4000 MPa @0.20 mm filament diameter.

"Mega Tensile Strength (MT) Steel" means a carbon steel with a tensile strength of at least 4500 MPa @ 0.20 mm filament diameter.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

The invention is best described in two embodiments. Within each embodiment, there are permissible variations within the scope of the invention. Both embodiments are designed to be useful in composite systems, providing the necessary mechanical locking interface and resistance to compression stress states.

Figure 1:
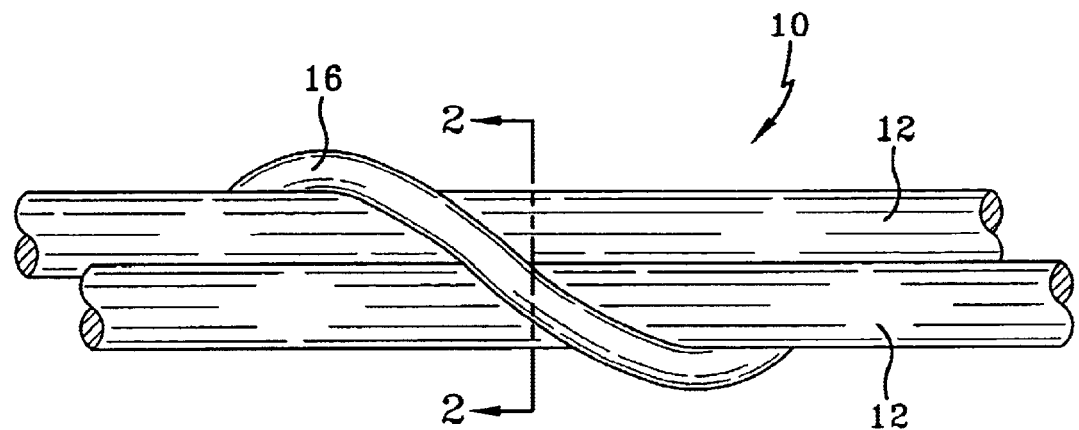
FIG. 1 is a side view of a cord in accordance with the present invention.
Figure 2:
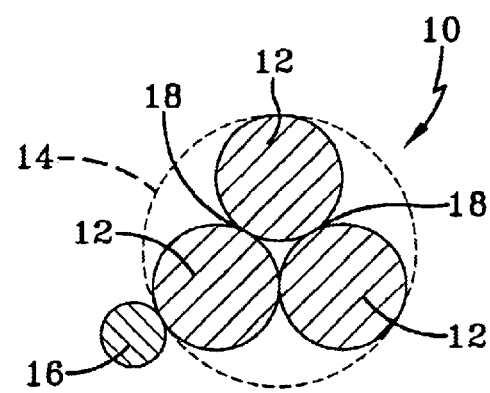
FIG. 2 is a cross sectional view of the cord of FIG. 1.

FIG. 1 illustrates the first embodiment 10. The cord 10 is best described as a multitude of relatively, or essentially, straight, parallel and nested wire filaments 12 that form the core 14, helically wrapped by at least one wire 16. The core filaments 12 have a twist lay length of greater than 30 mm, with a preferred twist lay length of infinity. The wrap wire 16 acts to create a mechanically locking cord structure. FIG. 2 is a cross sectional view of the cord 10. The number of core filaments 12 can vary from two to at least thirty. Preferably, the number of core filaments 12 is three to twelve.

The core filaments 12 are parallel and nested. The description of the filaments 12 as parallel is relatively self-explanatory in that the filaments 12 form a line of contact with adjacent filaments 12 that extends along the length of the adjacent filaments 12. In FIG. 2, the line of contact passes through point 18. Each filament 12 has at least one contact point 18 or line. The core filaments are either straight, i.e., no twist, or essentially straight, wherein the twist lay length is greater than 30 mm, and preferably infinity. Unlike traditional cord manufacturing, no pre-form or wave is imparted to the filaments 12. When multiple cords 10 are aligned and formed into a fabric, a minimum setting pressure is used on the warp wire(s) to ensure the core filaments 12 remain relatively straight and the cord 10 behaves as desired in subsequent manufacturing operations. The description of the filaments being nested means that the filaments, 12 fit closely together to form a compact structure; this being opposed to a structure with a distinct linear aspect or a non-compact structure.

The core filaments 12 are formed from metallic material, preferably steel. Steel has the advantage of high strength, very high stiffness, and low cost. The cord 10 takes advantage of the compressive strength of the material forming the filaments. Each core filament 12 has a substantially circular, oval, or obround cross sectional configuration with a maximum diameter in the range of 0.30 to 1.30 mm. The preferred cross sectional configuration of the core filaments is circular. The core 14 itself has an overall diameter defined along the illustrated dashed circle. The diameter of the core is determined by the outermost surface of the core filaments 12 or by the circle created by the innermost surface of the helical wrap wire 16.

Figure 3:
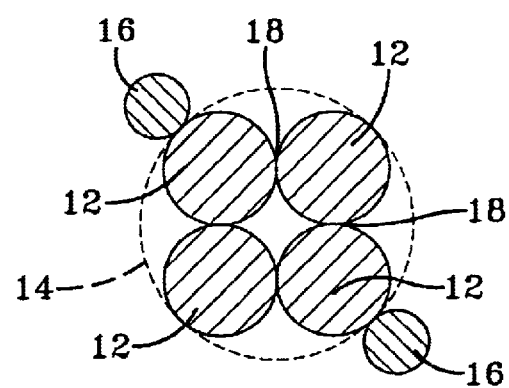
FIG. 3 is an alternative of the cord of FIG. 1.

The wrap wire 16 may have a diameter smaller than the core filaments 12. The diameter of the wrap wire 16 is preferably 30–100% of the diameter of the core filaments 12. The number of wrap wires 16 used in a single cord 10 may dictate the diameter of wrap wires 16. The diameter of the wrap wires 16 may also be dictated by the number of core filaments 12. The diameter of the wrap wires 16 is in the range of 0.10 to 0.30 mm. FIG. 3 illustrates a 4×2 cord wherein there are four core filaments 12 and two wrap wires 16.

The wrap wires 16 may be formed from the same material as the core filaments 12, but may also be different. The wrap wires 16 may be formed from steel, glass, carbon, Kevlar, polypropylene, nylon, aramid, or metallic wires such as titanium, aluminum, beryllium. When formed from steel, the wrap wires 16 have a preferred strength of at least 2500 MPa at a 0.20 mm filament diameter. The wrap wire 16 may be NT Steel, HT Steel, ST Steel, UT Steel, or MT Steel. When using a steel filament of a greater strength, the cord 10 takes advantage of the tensile strength for that portion of loading that will occur in the composites.

The wrap wires 16 are helically wound at optimum lay lengths to provide efficient machine through put of the cord 10 and optimum confinement and support of the core filaments 12, especially in the compression state. In accordance with the invention, the helix wrap angle is less than the core filament critical buckling wave length; this is discussed later in further detail. By winding at this angle, the wrap wire 16 provides additional strength to the cord 10 to prevent buckling under compression states. However, the helix wrap angle may be optimized for cost effect support of the core filaments 12 when the cord 10 is in a compression state; in such instance, the helix wrap angle may be greater than the buckling wave length of the nested filaments 12.

Both the core filaments 12 and the wrap wires 16 may be coated to improve adhesion to the matrix in which the cords 10 will be used. Common coatings include, but are not limited to, brass and AO-brass coatings such as those used for coating steel filaments.

The cord 10 of FIG. 1 possesses excellent metallic packing density when molded into a composite and exhibits greatly improved compression behavior, both static and fatigue, through enhanced core filament buckling strength due to the elimination of a blooming stress found in traditional cord structures and further explained herein.

Figure 4:
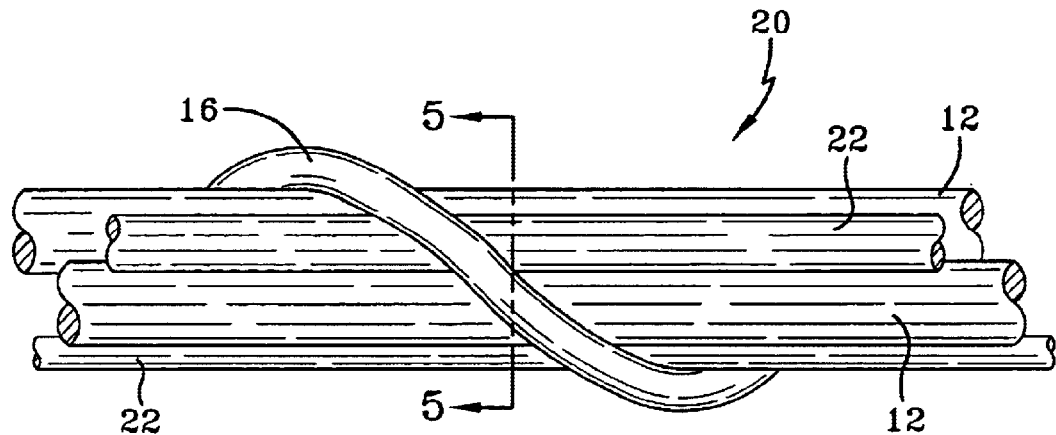
FIG. 4 is a side view of a cord in accordance with the second embodiment.

The cord 20 of FIG. 4 illustrates the second embodiment of the invention. The cord 20 is a hybrid fiber-metallic cord structure. The cord 20 has enhanced packing density in the matrix, increasing the compression behavior by providing micro buckling support for the metallic core filaments 12 and greatly enhancing the transverse tension strength and the off cord axis strength characteristics.

In this embodiment, the core filaments 12 and wrap wires 16 are as detailed in the cord 10 previously discussed, the metallic core filaments having either no twist or a twist lay length of greater than 30 mm. Included in this embodiment is a precise amount of fiber that is co-mingled with the core filaments 12 prior to the helical over-winding step. The result is a cord 20 with essentially straight, nested metallic filaments 12 and fiber filaments 22, helically wrapped with one or more wires 16.

Figure 5:
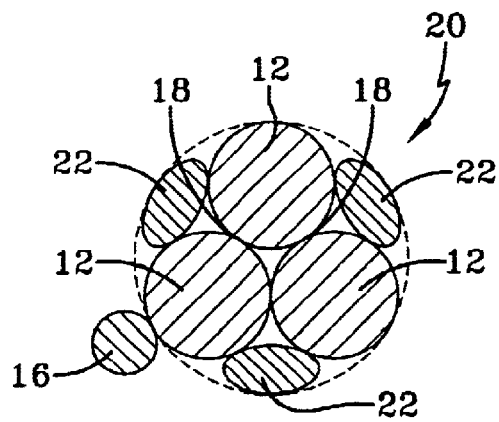
FIG. 5 is a cross sectional view of the cord of FIG. 4.
Figure 6:
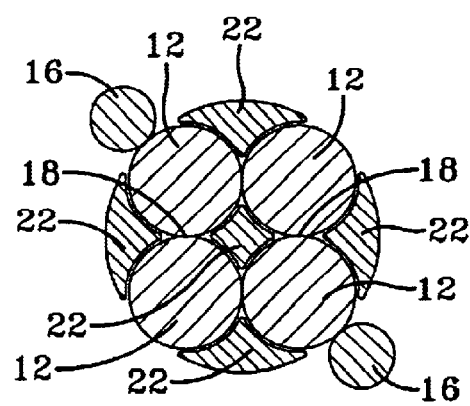
FIG. 6 is an alternative of the cord of FIG. 4.

The hybrid fiber-metallic cord 20 is optimized when the volume amount of fiber 22 co-mingled with the metallic wire filaments 12 equals the free spaced created by the cylindrical dimensions of the helical wrap wire, see FIG. 5. The optimized amount of fiber 22 fills the natural intestacies created by the larger metallic core filaments 12 and the extended cylindrical helix formed from the wrap wires 16. FIG. 6 illustrates a more densely packed cord formed of four core metallic filaments 12, at least five areas of packed fiber 22, and two wrap wires 16.

The fiber 22 used in this embodiment can be any conventional fiber. Examples are glass, carbon, Kevlar, polypropylene, nylon, aramid, cotton, wool, lycra or even other metallic wires such as titanium, aluminum, beryllium. The fiber may be synthetic, natural, or metallic. The diameter of the fibers 22 is preferably smaller than the diameter of the metallic core filaments 12. As seen in the illustrations, the fibers 22 may not have a perfectly circular cross configuration but may be distorted to other shapes in order to densely pack the core 14.

The resulting hybrid cord structure 20 makes superior composites and resulting structures or applications, as the reinforcement to matrix ratio is maximized in each layer and the ply thickness for a given strength and stiffness is minimized.

The inventive structures provide several key benefits. The fiber 22, closely packed into the core structure 14 and further confined by the metallic helical wrap wire 16, provide excellent support for the primary metallic core filaments 12 of the cord 20. This micro buckling support is best described when viewing the metallic core filaments 12 as columns acting together to resist bucking due to compressive forces acting on a laminate made from the hybrid cord 20. The fiber 22 acts to reinforce and stiffen the matrix material surrounding the core metallic filaments 12. Buckling equations used to model column buckling on an elastic foundation and actual test results show the positive benefit of this increased support for the core filaments 12.

Also, the fiber 22, wrapped into the cord 20 by the wrap wire 16, serves to greatly enhance the interlaminar and transverse tension behavior of composites made from the hybrid cord 20. Using fiberglass as an example, the glass fiber contained in the hybrid cord 20 acts to bond to glass fibers contained in adjacent hybrid cords 20 or other all glass layers or fibers. The mechanical interlock formed by the helical metallic filament 12 wrapping the glass fiber into the hybrid cord 20 provides a ultra high strength, filament dominant bond, overcoming any limitations that a purely chemical bond between the glass and metallic core filaments resulting in very high transverse tension properties.

Lastly, the hybrid core 20 aids in the wet lay-up performance of tapes made from the novel hybrid cord structure. Again using glass as an example, the fine glass contained in the hybrid cord 20 and tapes or fabrics made from the hybrid cord 20, work, using capillary action, to wet the hybrid cord 20 fully with wet lamination resins and hold the resins in place, without draining away, until gel and ultimate cure is reached. A further benefit of this intense added capillary suction is to hold tapes, fabrics or ply made from the hybrid cord 20 in place during lamination. Examples of where this is important is when using the inventive material in zero pressure wet laminations on complex contours, vertical laminations common to boat building or overhead work commonly encountered in infrastructure repair. It should be noted that other fibers, or combinations of fibers, can be used for specialty applications. Examples of these are cords containing Lycra for vibration damping or cords containing a mix of glass and polypropylene fibers, which would have unique processing capability.

The two disclosed embodiments of this invention, and the multiple variations of the embodiments, work to overcome the low compressive behavior limitations of prior art cords. It should be noted that prior cord development has focused on tire applications where the cord structure must be highly flexible to carry tensile and flexural bending loads commonly found in tire loading conditions. Cords designed to carry tension dominated loads tighten in the elastomeric matrix and use a cable action to keep the steel filaments from yielding or fatiguing. However, when applied in composites, the characteristics that make typical cords behave well in tire applications becomes the limiting factor in structural performance.

Composites made from tapes constructed from typical tire cords exhibit extreme asymmetrical structural performance, see Table 1. Two conventional prior art tire cords, wherein the center core filaments were twisted to form a bundled core, were made into tapes by aligning multiple cords and forming a fabric-type tape by applying a weft filament. Both tapes were formed in identical fashion and molded into composites using identical material into which the tapes where molded.

Tensile performance, as reported in Table 1, agrees closely with expected calculations; however compressive performance falls short of theoretical calculations. Close observation of failure mechanics of the cords has shown that individual compressive filament buckling is responsible for the compressive strength failure.

TABLE 1

| Cord Type | Tensile Strength (Ksi) | Compressive Strength (Ksi) |
|---|---|---|
| 12x1 | 137 | 80 |
| 3X2 | 169 | 132 |

The present invention works to overcome the four noted limiting factors for conventional tire cords as previously described. Looking at each factor:

Factor 1: Low composite packing density. Cords typical of rubber and elastomeric reinforcements, such as conventional tire cords, exhibit low packing density when molded into composite materials under moderate or low pressure. The low packing density is a result of one or two factors depending on the type of cord used. For cords as described in U.S. Pat. No. 4,022,009, low packing density is the result of the highly asymmetric cord structure. When packed in successive layers, the highly asymmetric cord structures result in areas of the composite where there is metal to metal contact followed by large resin rich areas. Experimental results show that this asymmetry limits the composite to packing density not exceeding 50 volume percent under moderate vacuum pressure. Summarily, for cords such as a 12×1, consisting of many small filaments bunched and twisted together and wrapped, low packing density results from the inefficient combination, twisting, and resulting cross-overs of many small filaments. As shown in Table 2, the hybrid cord of the present invention improves this low packing density, and enhances the resulting composite properties of composites. Similar to the cords of Table 1, the cords were woven into tapes and then molded into composites. All of the cords were treated in the same manner as those of Table 1.

TABLE 2

| Cord Type | Max Volume of Cord in a Composite | Tensile Modulus (msi) | Tensile Strength (Ksi) | Compressive Strength (Ksi) |
|---|---|---|---|---|
| 12X1 | 30% | 9 | 137 | 80 |
| 3X2 | 36% | 11 | 169 | 132 |
| 3Sx1* | 41% | 12.5 | 147 | 147 |
| 3SFx1** | 50% | 15 | 147 | 152 |

*S stands for essentially straight filaments
**S stands for essentially straight filaments and F stands for fiber additive included in the core of the cord.

Factor 2: Kinks caused by permanent deformations of the core filaments. The present invention overcomes this problem by eliminating or essentially eliminating core filament twisting and by using a helical wrap wire having a smaller diameter than the diameter of the core filaments. Further, mechanical working of the cord has been minimized to eliminate the formation of kinks commonly formed as conventional cords are passed through killing rolls; the killing rolls being used to set the cord structure and provide mechanical kinks excellent for tensile applications but detrimental for compressive behavior. Because composites made from any fiber or metallic cord structure fail by filament buckling, the kinks typical in a common tire cord provide exaggerated areas where the filaments are prebuckled. Combined with the incorrect filament alignment due to the twist angle of the core filaments, these factors greatly contribute to the low compressive performance of the composites made from typical tire cords.

Factor 3: Core filament misalignment. The invention described herein eliminates core filament misalignment by using core filaments that are completely straight, or essentially straight, nested along single and parallel contact planes with adjacent filament, and not mechanically worked out of the primary load plane. Typical tire cords, such as a bunched 12×1, have core filaments that are twisted at a specified lay length to provide load sharing and cable action perfect for tire tension and bending loads. However, the core filament twist leads to a "blooming stress" (a stress that causes the cord bundle to dilate under compressive loads). This blooming stress, especially when coupled with the other compressive stress failure factors, is the primary cause of failure in compression, and it can be shown that this detrimental blooming stress rises by a function of the square of the twist angle. It was a specific objective of this invention to eliminate this bloom stress by reducing the twist angle of the core filaments. Upon close inspection of failed flexural samples, the failure mode has been altered from an individual compressive filament blooming, as found in samples made from bunched 3×2 and 12×1 cords, to a ductile failure followed by a global total cord buckling mode. The tensile yielding shown in the samples shows that the new cord invention now gives balanced performance in composites as compared to the unbalanced performance found when molding with traditional tire cords.

Factor 4: Small core filament diameter. Since most composite operations do not require design factors such as "ride performance" (factors unique to tire design), the size of the filament contained in the cord can be manipulated to provide increased performance without sacrificing performance in other areas. Small filaments contained in typical tire cords, having filament diameters of less than 0.30 mm, perform poorly in compression due to their small size. It can be shown that individual filament buckling strength is proportional to the square of the filaments size. Increasing the core filament size, as done in the present invention, greatly increases the buckling strength of the filaments. Further, by increasing the diameter of the core filaments 12, the wavelength associated with buckling behavior can also be dramatically lengthened. It is an object of this invention to lengthen the buckling wavelength of the core filaments 12 to a length in excess of the lay length of the helical over wrap filament. By lengthening this critical wavelength, the helical over wrap wire can be economically placed, and provide meaningful confinement to assist the core filaments to act in unison in a cord buckling mode as opposed to an individual filament buckling mode. Further by co-mingling metallic filaments 12 and fiber filaments 22 as in the hybrid cord 20, additional support is provided to the metallic core filaments 12 to provide additional buckling resistance. As discussed above, flexural coupons made using the improved cords 10 and hybrid cords 20, show first failure as tensile yielding as opposed to compression blooming typical in standard bunched or twisted cords, proving the validity of the claims of increased compression performance.

The inventive cords can be used as reinforcing cords in a variety of structures and materials, including, but not limited to, composites, plastics, wood laminates, and cements.

As mentioned above, the cords may be aligned and formed into a fabric or tape format. The wire tape made from the above described cords may be woven or a scrim/glue assembled layer. Also the tape may be a single layer or have a multi ply format that effectively holds a number of wires together in a tape format of various widths. Whatever construction is chosen to form the tape, it is important that no additional tension be applied that could create kinking in the core filaments. The minimum possible pressure or tension is applied to the cords when forming the tape, whether applied by means of weft cords or other assembly means.

The formed tape or fabric (depending on the relative width of the structure being formed by the aligned cords) can then be assembled into a composite in one or more layers, where the binding matrix of the composite acts to glue the layers together, and in some cases, to the other parts of the structure. The tape can be slit to customs widths and can also survive the stress of cross cutting with coming apart. The tape can be wet out with resin or cement by hand, impregnation machine or other "wet technique," or dry assemblies can be made and subsequently infused with resin through various closed mold techniques such as resin transfer molding, resin infusion, resin film infusion, injection molding or other like closed mold technique.

The cords can also be held in parallel configuration to create permeable or impermeable sheets/tapes/fabrics, depending on the end use application. Further, these layers cab be plied together in both forms to make multi direction reinforcement intended to counteract multi-axial states of stress in some applications.

In the permeable format, the wires can be held together in one of several ways to make a tape that can be molded into structural parts using any number of thermoset, thermoplastic or cementious processes. The tape can be made using a weaving process or a gluing process where the warp of reinforcing yarn is either woven with a weft of flexible yarn or glued to a scrim or tape product. The woven material can further be dipped in a solution to assist in stabilizing the structure. In the case where a backing scrim is used and the warp is glued, the scrim can be sized to provide an effective screed for use in hand lay-up or can be sized to provide some level of reinforcement transverse to the warp. Where a tape is used to hold the warp in place, the tape can either be a continuous piece of plastic or paper film that can be left in place once the material has been applied to the end structural component, or it can be die cut to form a continuous film filled with holes that are designed to let matrix material through to form "button hole" bonding sites. Further, the tape can be made of such a material to dissolve into the end use matrix material. An example of this dissolvable backing would be where the tape film is made of acrylic or polystyrene material. When either of these backing films is used in conjunction with a styrene based resin, such as polyester or vinylester, the backing tape would dissolve into the composite matrix resin with no adverse effects on flex strength or inter-laminar shear strength. Further to the process of gluing the wire warps together, the warp can be simultaneously glued together and the backing can be created using a spray or other equivalent hot melt adhesive application technology.

Permeable layers as described above can be used both in retrofitting and molding operations. In retrofit applications, layers can be applied to structures to give added stiffness, strength or a combination of properties. In molded parts, layers can be applied to structural parts to create composites that posses unique structural characteristic and low cost.

Resins for use with a tape of this type are thermosets, such as polyester, vinylester, epoxy, or other like resin, thermosetting thermoplastics, such as cyclic PBT or PET, cementious resins, such as polymer modified cements or gypsum or other matrix systems where impregnation cab be achieved to form a mechanical lock with the cords.

Also, when fully encapsulated, the reinforced sheet be a thermoplastic resin sheet wherein the inventive cords are arranged in a single or multi layer format where the thermoplastic resin fully encapsulates and mechanically locks with the individual cords. This layer can be bumpy, flat or a combination thereof. The layer can be made to be glued to other structures or can be intended as a stand-alone flat or moldable layer. Resins for a layer of this type are PVC, PET, polyethylene, polypropylene, nylon, acrylic, ABS, styrene, or other like engineering thermoplastics. The fully encapsulated sheet may be slit into small width tapes for use or may be continuously welded together into a multitude of wire reinforced thermoplastic structures.

The resulting structural reinforcing layer can be applied to a lead bearing structure to provide a large strength and stiffness critical structure where economic considerations are important. Examples of such load bearing structures are wind blades, boat hulls and decks, bridge decks, high pressure spool-able pipe, reinforced truck floors, pilings, fenders, docks, reinforced wood beams, retrofitted concrete structures, reinforced extrusions, or injection moldings or other like structural parts.

What is claimed is:

1. A reinforcing structure comprising:
   a core comprising a plurality of essentially straight, nested filaments arranged in parallel, the filaments forming a line of contact with adjacent filaments that extends along the length of the filaments, and
   at least one helically wound wire wrapped about the core.

2. A reinforcing structure as set forth in claim 1 wherein the nested filaments in the core are formed from metallic filaments.

3. A reinforcing structure as set forth in claim 1 wherein the at least one helically wound wire has a diameter less than the diameter of the nested filaments.

4. A reinforcing structure as set forth in claim 1 wherein the nested filaments have a diameter greater than 0.30 mm.

5. A reinforcing structure as set forth in claim 1 wherein the at least one helically wound wire has a diameter in the range of 0.10 to 0.30 mm.

6. A reinforcing structure as set forth in claim 1 wherein the core has a plurality of interstices located between the nested filaments and between the nested filaments and the at least one helically wrapped wire and wherein a plurality of the fiber filaments are located in the interstices.

7. A reinforcing structure as set forth in claim 6 wherein the fibers are selected from the group consisting of glass, carbon, cotton, KEVLAR, polypropylene, nylon, polyester, aramid, wool, and metallic fibers such as aluminum, titanium, beryllium or other like filament or fiber.

8. A reinforcing structure as set forth in claim 1 wherein the twist lay length of the nested filaments is greater than 30 mm.

9. A reinforcing structure as set forth in claim 1 wherein the twist lay length of the nested filaments is infinity.

10. A reinforcing structure as set forth in claim 1 wherein the at least one helically wound wire has a helix wrap angle optimized for cost effective support of the core filaments in compression.

11. A reinforcing structure as set forth in claim 1 wherein the at least one helically wound wire has a helix wrap angle less than the buckling wave length of the nested filaments.

12. A composite comprising a reinforcing structure as recited in claim 1 and a binding matrix.

13. A composite as recited in claim 12 wherein the binding matrix is selected from the group consisting of elastomer, thermoplastic, cement mixes, and wood laminates.

14. A composite subject to compression and tensile stress, the composite comprising a reinforcing structure as recited in claim 1 and a binding matrix.

15. A tape comprising multiple reinforcing structures as recited in claim 1 wherein the reinforcing structures are aligned and fixed in parallel relationship.

16. A tape as set forth in claim 15 wherein the reinforcing structures are woven with weft threads to form the tape.

* * * * *